Nov. 8, 1938.  A. H. WEISSER  2,136,200

FILTER CONSTRUCTION

Filed May 18, 1936  2 Sheets-Sheet 1

Inventor
Arthur H. Weisser
By Liverance and
Van Antwerp
Attorneys

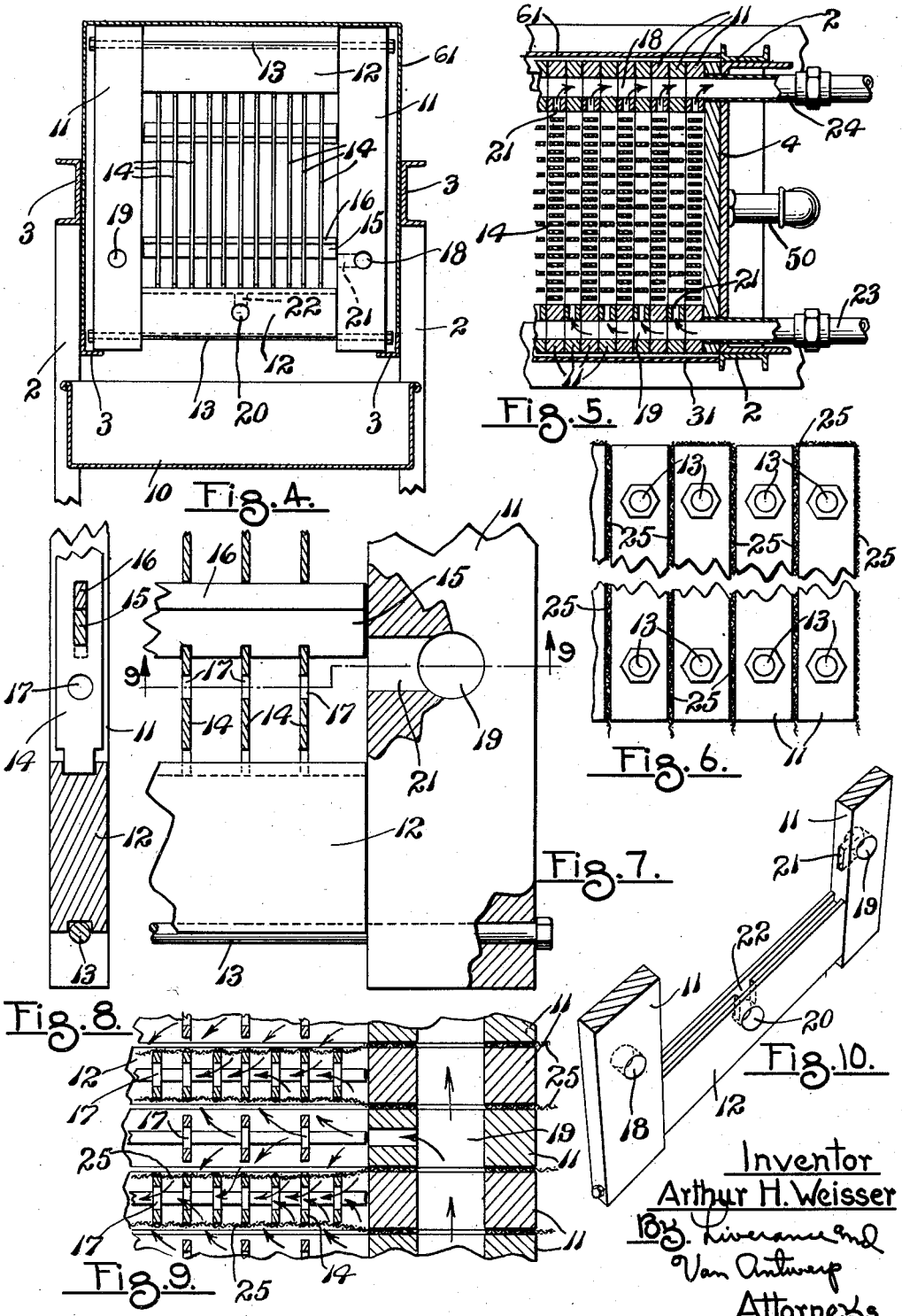

Patented Nov. 8, 1938

2,136,200

UNITED STATES PATENT OFFICE 2,136,200

FILTER CONSTRUCTION

Arthur H. Weisser, Grand Rapids, Mich., assignor to J. C. Miller Company, Grand Rapids, Mich., a corporation of Michigan Application May 18, 1936, Serial No. 80,375

2 Claims. (Cl. 210—188)

This invention relates to filter constructions. One place where the filter construction of my invention is particularly useful is in conjunction with the filtering of plating solutions, though the filter is not limited in any sense to the one place of use noted.

It is a primary object and purpose of the present invention to provide a filter construction which may utilize a plurality of filter frames located side by side and pressed tightly together, with fabric members between the adjacent sides of filter frames, and to force the solution which is to be filtered into alternate frames and thence through the fabrics into the other frames, from which other frames a return may be made out of the filter, the solution being strained and filtered and any dirt or undesirable material caught and retained by the fabric members. The invention has for a further object the flowing of water in a reverse direction through the filter construction entering alternate frames between the frames to which the solution filtered was first delivered, the water being forced through the fabric and disassociating dirt and other foreign material from the fabric members so that it is carried by the water through a drain into which the water with the dirt and foreign material therein may be delivered and carried out of the apparatus. With this construction a very rapid, easy and especially practical cleaning of a plating solution may be secured. It is also evident that many liquids other than plating solutions which may be contaminated with solid particles, dirt or other undesired material held in suspension therein, may readily be freed thereof by using the filtering apparatus of my invention.

Many other objects and purposes, together with novel constructions for attaining the same will be understood from the following description, taken in connection with the accompanying drawings, in which, Fig. 1 is an elevation, with parts broken away and in section, showing the filter apparatus of my invention.

Fig. 4 is a transverse vertical section substantially on the plane of line 4—4 of Fig. 1.

Fig. 5 is a fragmentary horizontal section substantially on the plane of line 5—5 of Fig. 1.

Fig. 6 is a fragmentary enlarged side elevation of the filter pack provided by a plurality of the frames located side by side with filtering fabric between adjacent sides of the frames.

Fig. 7 is a fragmentary elevation and section, with parts broken away, illustrating details of structure of the filter frames.

Fig. 8 is a fragmentary vertical section through the lower end portion of a filter frame.

Fig. 9 is a fragmentry horizontal section on the plane of line 9—9 of Fig. 7.

Fig. 10 is a fragmentary perspective view of the lower end portion of one of the filter frames.

The sections described are all taken looking in the directions indicated by the arrows, and like reference characters refer to like parts throughout the drawings.

Figure 1:
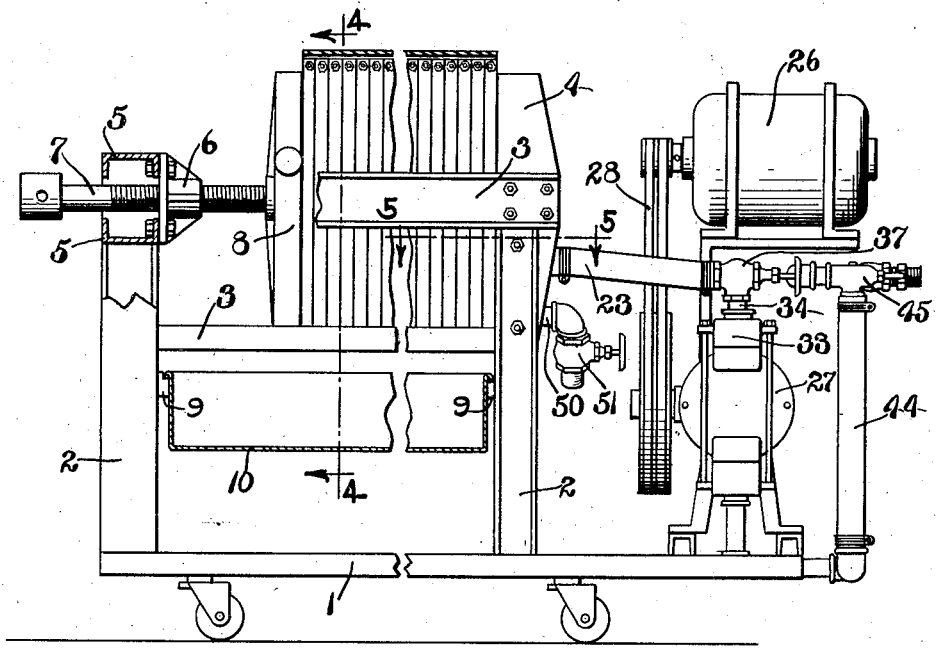

In the construction, a supporting frame 1 is provided having spaced apart vertical corner posts 2, with horizontal upper and lower longitudinal connecting rails 3 between the posts and, likewise, suitable horizontal transverse connecting members to provide a strong and rugged frame. At one end of the frame a vertically positioned head 4 is fixed. At the other end of the frame, between transverse cross beams 5 a threaded sleeve 6 is connected at one side of the beams, through which a screw 7 passes at the inner end of which is a pressing head 8, it being designed that between the rigid head 4 and the movable pressing head 8 a plurality of filter frames may be located, resting at their lower corner portions on the inturned flanges of the lower longitudinal rails 3 as shown in Fig. 4.

Transverse bars 9 serve to support a drip pan 10 underneath the filter frames as shown in Fig. 1.

The filter frames are of rectangular shape comprising two spaced apart vertical bars 11 connected by upper and lower cross bars 12, these bars surrounding a substantially square open interior space. The frames are securely held together by headed rods 13 which have nuts to thread thereon at one end and which pass through the vertical bars 11 above and below the horizontal bars 12. Within the open space a plurality of spaced apart relatively thin vertical bars or slats 14 are located, and are held in spaced relation by transverse bars 15 which pass through openings through the slats 14 and which bars 15 are notched at their lower edges (Fig. 7) to engage with the vertical slats 14 and are held against upward movement by key bars 16 which pass through the slats 14 and bear against the notched bars 15. The slats 14, adjacent both their upper and lower ends, each have an opening 17 therethrough, the openings preferably being in longitudinal alinement. Likewise the ends of the slats 14 are reduced in width providing tenons to enter grooves made in the upper and lower edges of the lower and upper bars 12, respectively. The tenons extend above and below the inner edges of said lower and upper bars thereby providing free communication between the spaces between the several slats 14. See Fig. 8.

There are two types of filter frames used. One type of frame has a number of slats 14 substantially equally spaced from each other. The number of slats is such that they are spaced relatively wide distances apart. The other type of frame has a much larger number of slats in the same space. In practice there is twice the number of slats used so that the slats in the second type of frame are spaced from each other substantially one-half of the distance apart that they are spaced in the first type of frame described. The opposed vertical members 11 of all of the frames have openings 18 and 19 horizontally therethrough a short distance above the lower bar 12, which bar likewise has a horizontal transverse opening through it. In those frames which have the lesser number of slats connecting passages 21 are made from the inner edges of the vertical bars 11 to the openings 19. In the other frames which have double the number of vertical slots 14, the same type of opening 21 is made in the bar 11 at the opposite side of the frame to connect with the openings 18. Likewise in the first type of frame, having the lesser number of slats, a vertical passage 22 is made from the upper edge of the bar 12 to the horizontal transverse opening 20 therethrough. When these frames are located side by side and in alternate relation to each other, as shown in Fig. 5, the openings 19 of all of the frames make a continuous horizontal conduit at one side in alinment with a pipe 23 which is connected to and extends through the fixed head 4. The openings 18 make a similar horizontal conduit at the opposite side in direct alinement and conjunction with a similar pipe 24 similarly extending through and connected with the head 4 (see Fig. 5).

In practice the second type of frame mentioned, the ones having the greater number of vertical slats 14, are equipped each with a fabric covering 25 to cover both sides thereof, the covering being secured to the frame by tacks or other suitable fastenings. At the openings 18, 19 and 20 the fabric covering at each side of each frame has an opening cut therein of the same diameter as said openings 18, 19 and 20. In assembling the frames, a fabric covered frame, having the larger number of vertical slats 14 therein, is placed between frames which do not have the fabric covering and which have the lesser number of vertical slats 14, so that the two types of frames are located in alternate relation to each other. This provides a thickness of fabric between adjacent sides of all of the frames which are placed together as shown in Fig. 1. When the frames are all located together, the screw 7 may be operated to force the head 8 against the outermost frame and clamp the filter frames all together and against the fixed head 4 as shown in Fig. 1. The filter construction is now ready to serve its purpose of filtering a plating or other solution.

As is shown in Fig. 1 an electric motor 26 drives a suitable pump 27 through the belt means 28.

Figure 2:
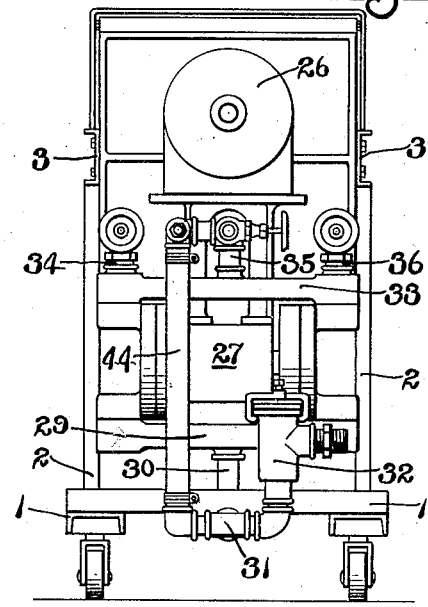
Fig. 2 is an end view of Fig. 1.

The pump 27 has a lower header 29 which receives the incoming fluid through the inlet pipe 30. The inlet pipe 30 leads from the T 31 which in turn leads from the inlet connection 32. See Fig. 2.

Figure 3:
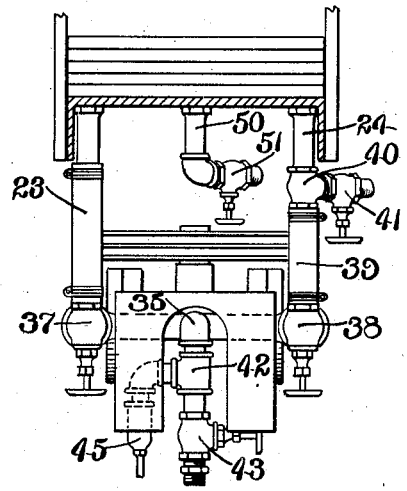
Fig. 3 is a plan view, partly in section and having the motor and its belts removed in order to expedite the showing.

The pump 27 has an upper header 33 which has three outgoing passageways 34, 35 and 36. The passageway 34, see Fig. 1, is connected through the valve 37 to the inlet pipe 23, previously mentioned. The opposite passageway 36 leads through a valve 38, see Fig. 3, a short hose connection 39, through a T member 40 and then connects onto the outlet pipe 24 previously mentioned. The other opening of the T member 40 has a valve 41 attached thereto.

The central passageway 35, leading from the header 33, is connected through a T 42 onto a valve 43. The third opening of the T connects to the by-pass 44 having a relief valve 45 whereby any excessive pressure generated by the pump is relieved.

The filter frames are provided with a waste outlet pipe 50 having a valve 51 attached thereonto.

The operation

The inlet connection 32 is supplied with a suitable fluid and operation of the pump by means of the motor causes this fluid to be drawn through the inlet connections 31, 30 and 29 and then forcibly expelled into the header 33. Normally the valves 43 and 38 are closed and thus the fluid passes through the open valve 37 along the inlet pipe 23 and then into the filter frame construction as shown by the arrows in Fig. 5 of the drawings. The solution passes from said inlet conduit into the frames having the lesser number of slats 14. It comes to the fabric between the frames, which fabric is pressed against the vertical edges of the slats 14 of the intermediate frames. There being a large number of said slats the fabric is held from bulging inwardly to any extent and the clear strained solution passes through the fabric. Dirt and other solid foreign matter remain at the sides of the fabric presented toward the frames into which the solution first enters. The solution passes through the openings 17 and through the passages made at the lower ends of the slats 14 and then through the passages 21 into the conduit at 18, as shown in Fig. 5. The solution may be pumped and forced through the filter more than once if it is needed to remove dirt or other foreign material. The fluid egresses through the pipe 24 and is then expelled through the opened valve 41.

During the operation of forcing the solution through the filter to cleanse it outlet pipe 50 is closed by the valve 51 so that the solution will not escape therethrough.

After the filtering operation has been performed a flushing with water to remove the dirt or other foreign materials screened or filtered from the solution is performed by forcing water through the passageway 36, the opened valve 38, the short hose connection 39, the T 40, then along the passageway 24 into the filter frame construction. During this operation the valves 43 and 37 are closed and the valve 51 is opened. Thus the fluid flows downwardly from the several spaces between the filter frames into the alined passage 20 and then outwardly through the outlet pipe 50 and its associated valve 51. The liquid reverses its flow, as previously described, and thus in a very short time the filter is entirely cleaned of the dirt collected by a previous filtering operation and is also washed free of any solution which might remain in the filter and which might have a damaging effect upon the frames or fabric with which said plating solution comes in direct contact.

The fabric members 25 used are made preferably of a suitable closely woven canvas through which even the finest particles of solid matter will not pass. The force required to pump the solution through the filter, while relatively high, is in no sense detrimental to the filter operation. The filter construction, which has been devised by reason of the right binding of the filter frames together, permits a more perfect filtering of plating solutions and an accomplishment of the filtering in the least possible time. Should there be any leakage through the interposed fabric members between the frames it is collected in the drip pan 10 and none of the solution is lost. The filter apparatus of my invention has proved exceptionally practical and useful.

The filter frames are adapted to be located underneath and covered by a suitable sheet metal housing 61 (Figs. 4 and 5), though the operation of the filter is in no way dependent upon this covering, which is of use principally for purposes of appearance.

The invention is defined in the appended claims and is to be considered comprehensive of all forms of structure coming within their scope.

I claim:

1. In an apparatus of the class described, a plurality of open frames positioned side by side and held together, fabric between the adjacent sides of said frames, each of said frames in the opposite side members and in the lower member thereof having a transverse opening and said fabrics having corresponding openings whereby when the frames are positioned together conduits are provided, one at each side and one at the bottom of the pack of frames and fabrics, alternate frames at one side having passages extending laterally from the transverse openings therethrough to the inner side of the frame, and the other frames having like lateral passages from the openings in the opposite sides thereof to the inner side of the frame, and the bottom members of alternate frames having vertical passages leading from the interior of the frame to the transverse openings therethrough, and spaced apart vertical slats located in the open space of each frame, alternate frames having substantially double the number of vertical slats that there are in the remaining frames between and correspondingly spaced apart substantially one-half of the distance from each other that the slats are spaced in the said remaining frames.

2. A filter construction of the character described comprising in combination a plurality of frames, a fabric member between each of said frames, a series of passageways through which a solution may be forced through each of said fabric members in one direction, and another series of passageways through which water may be forced through each of said fabric members in the opposite direction, each of alternate frames having therein a plurality of parallel spaced apart slats, and each of the remaining frames having therein a plurality of parallel spaced apart slats of substantially twice the number contained in said alternate frames as and for the purpose described.

ARTHUR H. WEISSER.